3,553,207
PHENYLPYRAZOLODIAZEPINONE COMPOUNDS
Ivan C. Nordin, Ann Arbor, Mich., assignor to Parke,
Davis & Company, Detroit, Mich., a corporation of
Michigan
No Drawing. Filed Dec. 16, 1968, Ser. No. 784,262
Int. Cl. C07d 53/02
U.S. Cl. 260—239.3                4 Claims

ABSTRACT OF THE DISCLOSURE

6 - hydroxy- and 6 - acetoxy - 3 - methyl - 8 - phenylpyrazolo[4,3-e]-[1,4]diazepin - 5(1H) - one compounds substituted in the 1-position by methyl or ethyl and optionally in the 4-position by methyl; salts thereof; and their production by (a) reacting a 3-methyl-8-phenyl-pyrazolodiazepinone, 7-oxide compound with acetic anhydride to produce one of the 6-acetoxy compounds and (b) hydrolyzing one of the 6-acetoxy compounds to produce one of the corresponding 6-hydroxy compounds. The compounds of the invention are useful as anticonvulsant and anti-anxiety agents.

SUMMARY AND DETAILED DESCRIPTION

The present invention relates to new pyrazolodiazepinone compounds that are useful as pharmacological agents and to methods for their production. More particularly, the invention relates to new phenylpyrazolodiazepinone compounds having the formula:

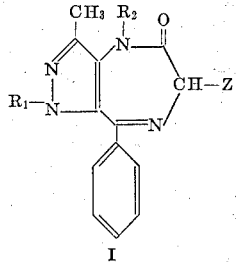

I and to pharmaceutically-acceptable salts thereof; where $R_1$ is methyl or ethyl, $R_2$ is hydrogen or methyl, and Z is hydroxy or an acetoxy group.

In accordance with the invention, phenylpyrazolodiazepinone acetate ester compounds having the formula:

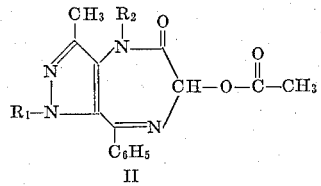

II are produced by reacting a phenylpyrazolodiazepinone oxide compound having the formula:

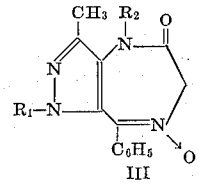

III with acetic anhydride; where $R_1$ and $R_2$ have the aforementioned significance. The reaction is best and most conveniently carried out employing a moderate to large excess of acetic anhydride, and added solvent is not required. If desired, however, any of a number of unreactive solvents may be used, including chlorinated hydrocarbons, such as dichloromethane and chloroform; lower alkanoic acids, such as acetic acid and propionic acid; and tertiary amides, such as N,N-dimethylformamide, N,N-dimethylacetamide, and N-methyl - 2 - pyrrolidinone; as well as mixtures of these. Neither the temperature nor the duration of the reaction is critical, and each may be varied over a wide range, the temperature from about 10° to 150° C. and the duration from about 10 minutes to about 48 hours. Preferred conditions are a temperature between 80° and 100° C. and a period of from 20 to 60 minutes.

The phenylpyrazolodiazepinone oxide compounds used as starting materials in the foregoing processes are conveniently prepared by reacting a phenylpyrazolodiazepinone compound having the formula:

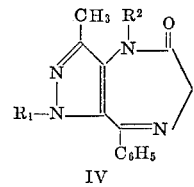

IV with an oxidizing agent, such as m-chloroperbenzoic acid. The phenylpyrazolodiazepinone compounds of Formula IV are in turn prepared by reacting a 4-amino-5-benzoyl-3-methylpyrazole having the formula:

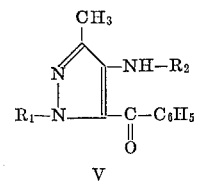

V with a lower alkyl ester of glycine, especially with glycine ethyl ester in hydrochloric acid salt form, in a basic solvent medium in the presence of a basic catalyst. The 4-amino-5-benzoyl-3-methylpyrazoles of Formula V are in their turn prepared by a variety of methods, as illustrated in greater detail hereinafter for the preparation of individual compounds. In Formulas IV and V, $R_1$ and $R_2$ are as defined previously.

Also in accordance with the invention, phenylpyrazolodiazepinone compounds having the formula:

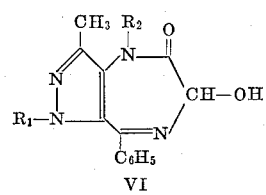

VI are produced by the hydrolysis of a phenylpyrazolodiazepinone acetate ester compound having Formula II above; where $R_1$ and $R_2$ are as defined earlier. The hydrolysis can be carried out under either acidic or alkaline conditions, by the use of an acidic or basic hydrolytic agent. Alkaline conditions are preferred because the product of the hydrolysis, that is, the phenylpyrazolodiazepinone compound of the invention having Formula VI above, is unstable upon prolonged contact with an acidic medium. The hydrolysis can be carried out in water or in an aqueous solution of an unreactive, water-miscible, organic solvent, such as an aliphatic alcohol, a tertiary amide, or dimethyl sulfoxide, to which has been added an acid or a base to render the medium acidic or alkaline. Some examples of suitable bases are alkali metal hydroxides and alkaline earth metal hydroxides. Preferred agents are alkali metal hydroxides, such as sodium hydroxide and potassium hydroxide. The hydrolytic agent is preferably used in an amount equivalent to the amount of phenylpyrazolodiazepinone acetate ester employed, although a slight excess of the former would not be harmful. To insure complete hydrolysis, at least an equivalent of water should be included in the reaction medium. The temperature and duration of the hydrolysis reaction can be varied widely, the temperature from 0° to 50° C. and the duration from about 15 minutes to about 48 hours. A preferred temperature is one between about 10° and about 30° C., and at such temperature, the reaction is normally complete after 16–24 hours. At the conclusion of the hydrolysis, the pH of the reaction mixture is adjusted to 7–8, and the product is isolated by conventional means.

The free phenylpyrazolodiazepinone compounds of the invention having Formula I where $R_2$ is hydrogen form pharmaceutically-acceptable salts by reaction with a strong base. Suitable bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides. In preparing the salts of the phenylpyrazolodiazepinone acetate ester compounds, care should be taken to avoid prolonged contact with the chosen strong base in order to avoid hydrolysis of the acetate ester grouping. The free phenylpyrazolodiazepinone compounds and their salts may differ in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained in this test for representative compounds of the invention are shown in the following table, where the compounds are identified by reference to Formula I.

ANTICONVULSANT ACTIVITY

| Compound | | | Dose, mg./kg. | Rating |
|---|---|---|---|---|
| $R_1$ | $R_2$ | Z | | |
| —$C_2H_5$ | —H | —$OCOCH_3$ | 250 | 4+ |
| | | | 125 | 4+ |
| | | | 63 | 4+ |
| | | | 32 | 4+ |
| | | | 16 | 1 |
| | | | 8 | 0 |
| —$C_2H_5$ | —$CH_3$ | —$OCOCH_3$ | 250 | 4+ |
| | | | 125 | 4+ |
| | | | 63 | 4+ |
| | | | 32 | 4+ |
| | | | 16 | 0 |
| —$CH_3$ | —H | —$OCOCH_3$ | 250 | 4+ |
| | | | 125 | 4+ |
| | | | 63 | 4+ |
| | | | 32 | 4+ |
| | | | 16 | 3–4+ |
| | | | 8 | 1+ |
| | | | 4 | 0 |
| —$C_2H_5$ | —H | —OH | 250 | 4+ |
| | | | 125 | 4+ |
| | | | 63 | 4+ |
| | | | 32 | 4+ |
| | | | 16 | 4+ |
| | | | 8 | 2+ |
| | | | 4 | 0 |
| —$C_2H_5$ | —$CH_3$ | —OH | 250 | 4+ |
| | | | 125 | 4+ |
| | | | 63 | 4+ |
| | | | 32 | 4+ |
| | | | 16 | 1+ |
| | | | 8 | 0 |
| —$CH_3$ | —H | —OH | 250 | 4+ |
| | | | 125 | 4+ |
| | | | 63 | 4+ |
| | | | 32 | 4+ |
| | | | 16 | 4+ |
| | | | 8 | 0 |

The anti-anxiety activity of the compounds of the invention is determined in a test that measures food consumption by rats that have been placed in an anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methocel, by oral intubation and is immediately placed in an individual metabolism cage. A 30-minute period is allowed for absorption of the test compound, and then each animal is given access to a milk preparation in a graduated and calibrated tube. The preparation consists of one part sweetened condensed milk and two parts water. The total milk intake of each animal after one and 2 hours is recorded and compared with that of a group of 8 untreated control animals. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities of representative compounds of the present invention, as determined by the foregoing procedure, are shown in the following table, where the compounds again are identified by reference to Formula I. The table also shows the results obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | | | Dose, mg./kg. | Milk Intake after 1 hour, ml. |
|---|---|---|---|---|
| $R_1$ | $R_2$ | Z | | |
| $-C_2H_5$ | $-H$ | $-OCOCH_3$ | 40 | 9.6 |
| | | | 20 | 7.1 |
| | | | 10 | 6.0 |
| | | | 5 | 5.8 |
| | | | 2.5 | 4.4 |
| $-C_2H_5$ | $-CH_3$ | $-OCOCH_3$ | 20 | 6.3 |
| | | | 10 | 3.8 |
| | | | 5 | 4.5 |
| $-CH_3$ | $-H$ | $-OCOCH_3$ | 40 | 7.4 |
| | | | 20 | 7.0 |
| | | | 10 | 5.6 |
| | | | 5 | 5.7 |
| $-C_2H_5$ | $-H$ | $-OH$ | 40 | 7.4 |
| | | | 20 | 10.6 |
| | | | 10 | 7.3 |
| | | | 5 | 3.3 |
| $-C_2H_5$ | $-CH_3$ | $-OH$ | 40 | 10.5 |
| | | | 20 | 8.2 |
| | | | 10 | 6.8 |
| | | | 5 | 2.8 |
| $-CH_3$ | $-H$ | $-OH$ | 40 | 5.1 |
| | | | 20 | 6.7 |
| | | | 10 | 6.4 |
| | | | 5 | 5.6 |
| | | | 2.5 | 3.9 |
| Diazepam | | | 40 | 10.7 |
| | | | 20 | 12.1 |
| | | | 10 | 7.4 |
| | | | 5 | 7.1 |
| | | | 2.5 | 8.0 |
| Chlordiazepoxide | | | 40 | 10.7 |
| | | | 20 | 11.4 |
| | | | 10 | 8.1 |
| | | | 5 | 4.7 |

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solution.

The invention is illustrated by the following examples.

EXAMPLE 1

A mixture consisting of 7.1 g. of 1 - ethyl - 4,6 - dihydro - methyl - 8 - phenylpyrazolo[4,3-e][1,4]diazepin-5 (1H)-one, 7-oxide and 75 ml. of acetic anhydride is stirred and heated at 95–100° C. for 30 minutes, and the resulting solution is evaporated under reduced pressure. The solid residue obtained is dissolved in ethyl acetate, and the ethyl acetate solution is washed with ice-cold aqueous sodium bicarbonate, dried, and evaporated to give 1 - ethyl - 4,6 - dihydro-6-hydroxy-3-methyl-8-phenylpyrazolo[4,3 - e][1,4]diazepin - 5(1H) - one, acetate ester; M.P. 201–202.5° C., following successive crystallizations from ether and ethyl acetate.

The sodium salt is obtained as follows. 1-ethyl-4,6-dihydro - 6 - hydroxy - 3-methyl-8-phenylpyrazolo[4,3-e] [1,4]diazepin - 5(1H) - one, acetate ester (6.5 g.) is stirred with 40 ml. of 0.5 N sodium hydroxide. The resulting mixture is filtered, and the filtrate is lyophilized. The solid residue obtained is dissolved in 25 ml. of hot N,N - dimethylformamide, and the solution is filtered, cooled, and treated with about 90 ml. of ether to precipitate 1 - ethyl - 4,6 - dihydro-6-hydroxy-3-methyl-8-phenylpyrazolo[4,3 - e][1,4]diazepin - 5(1H) - one, acetate ester, sodium salt, which is isolated, washed with ether, and dried.

The 1 - ethyl - 4,6 - dihydro-3-methyl-8-phenylpyrazolo [4,3 - e] - [1,4]diazepin - 5(1H)-one, 7-oxide starting material is obtained according to the following procedure.

To a stirred mixture of 35 ml. of 90% nitric acid and 60 g. of fuming sulfuric acid (23% sulfur trioxide) is added in portions, at such a rate so as to maintain the temperature at about 70° C., 29 g. of 1 - ethyl - 3 - methylpyrazole - 5 - carboxylic acid, and after addition is complete, the mixture is heated at 95–100° C. for 3 hours, cooled, and poured into ice water. The solid 1 - ethyl-3-methyl - 4 - nitropyrazole - 5-carboxylic acid that precipitates is isolated, washed with ice water, and dried; M.P. 157–160° C., following crystallization from ethyl acetate.

A mixture consisting of 30 g. of 1 - ethyl - 3 - methyl-4 - nitropyrazole - 5 - carboxylic acid, 20 g. of thionyl chloride, 3.0 ml. of N,N-dimethylformamide, and 200 ml. of toluene is stirred and heated at 95° C. for 2 hours, then cooled, and poured into about 200 ml. of ice water. The aqueous mixture is stirred for 10 minutes, and the toluene layer is separated, washed well with 10% aqueous potassium carbonate, dried, and evaporated. The residue, which is 1 - ethyl - 3 - methyl-4-nitropyrazole-5-carbonyl chloride, is dissolved in 50 ml. of benzene, and the solution is added to a suspension of 27 g. of powdered anhydrous aluminum chloride in 170 ml. of benzene. The reaction mixture is stirred and heated under reflux for 3 hours, cooled, and poured into ice water. The benzene layer is separated, washed with water and with 100 ml. of 1 N sodium hydroxide, dried, and evaporated to give 5 - benzoyl - 1 - ethyl-3-methyl-4-nitropyrazole; M.P. 52° C., following crystallization from ethyl acetate-petroleum ether.

A mixture consisting of 26 g. of 5 - benzoyl - 1 - ethyl-3 - methyl - 4 - nitropyrazole, 0.5 g. of Raney nickel, and 150 ml. of methanol is shaken with hydrogen at an initial pressure of 50 lbs./in.$^2$ until 3 molecular equivalents of hydrogen are taken up. The catalyst is then removed by filtration, and the filtrate is evaporated under reduced pressure to give 4 - amino - 5 - benzoyl-1-ethyl-3-methylpyrazole, isolated as an oil that is suitable for use without further purification. The hydrochloride salt, monohydrate, M.P. 175–177° C., is prepared by treating the free base in isopropyl alcohol with excess dry hydrogen chloride, adding ether to the resulting mixture, cooling, and isolating the precipitated salt.

A mixture consisting of 4.4 g. of 4 - amino - 5-benzoyl-1 - ethyl - 3 - methylpyrazole, 8.0 g. of glycine ethyl ester hydrochloride, 1.0 ml. of piperidine, and 35 ml. of pyridine is stirred and heated under reflux for 30 hours and then evaporated to dryness under reduced pressure. To the residue is added 50 ml. of water, and the aqueous mixture is extracted with 125 ml. of methylene chloride. The methylene chloride extract is treated with charcoal and anhydrous magnesium sulfate, filtered, and evaporated to give 1 - ethyl - 4,6 - dihydro-3-methyl-8-phenylpyrazolo[4,3 - e][1,4]diazepin - 5(1H) - one; M.P. 217–219° C., following crystallization from 95% ethanol.

To a solution of 26.8 g. of 1 - ethyl - 4,6 - dihydro-3-methyl - 8 - phenylpyrazolo[4,3 - e][1,4]diazepin-5(1H)-one in 500 ml. of dichloromethane is added with stirring 22 g. of 85% m-chloroperbenzoic acid. After the initial exothermic reaction subsides, the reaction mixture is kept at room temperature for 16 hours and is then shaken with a solution of 20 g. of sodium bicarbonate in 400 ml. of water. The organic phase is then separated, dried, and evaporated to give 1 - ethyl - 4,6 - dihydro-3-methyl-8-phenylpyrazolo[4,3 - e][1,4]diazepin - 5(1H) - one, 7-oxide; M.P. 198–199.5° C., following 2 crystallizations from ethanol.

EXAMPLE 2

Utilizing the procedure described in Example 1 above, the following phenylpyrazolodiazepinone acetate ester compounds are obtained from the reactions indicated below:

(a) From the reaction of 16 g. of 1-ethyl-4,6-dihydro-3,4 - dimethyl - 8 - phenylpyrazolo[4,3-e][1,4]diazepin-5(1H)-one, 7-oxide and 175 ml. of acetic anhydride, there is obtained 1 - ethyl - 4,6 - dihydro - 6 - hydroxy-3,4-dimethyl - 8 - phenylpyrazolo - [4,3 - e][1,4]diazepin-5(1H) - one, acetate ester; M.P. 173–175° C., following crystallization from ethanol-ether.

(b) From the reaction of 19 g. of 4,6-dihydro-1,3-dimethyl - 8 - phenylpyrazolo[4,3 - e][1,4]diazepin-5(1H)-one, 7-oxide and 200 ml. of acetic anhydride, there is obtained 4,6 dihydro - 6 - hydroxy - 1,3 - dimethyl-8-phenylpyrazolo[4,3-e][1,4] - diazepin-5(1H)-one, acetate ester; M.P. 235–241° C.

(c) From the reaction of 10.8 g. of 4,6-dihydro - 1,3,4-trimethyl - 8 - phenylpyrazolo[4,3 - e][1,4]diazepin-5(1H)-one, 7-oxide and 110 ml. of acetic anhydride, there is obtained 4,6 - dihydro - 6 - hydroxy - 1,3,4-trimethyl-8-phenylpyrazolo[4,3-e][1,4]diazepin - 5(1H)-one, acetate ester; M.P. 180–181.5° C., following crystallization from toluene-pentane.

The various starting materials used above are obtained as follows.

(A) 1-ethyl-4,6-dihydro-3,4-dimethyl-8-phenylpyrazolo [4,3-e]-[1,4]diazepin-5(1H)-one, 7-oxide A mixture consisting of 9.2 g. of 4-amino-5-benzoyl-1-ethyl-3-methylpyrazole, 8.5 g. of p-toluenesulfonyl chloride, and 150 ml. of pyridine is stirred and heated under reflux for 90 minutes, evaporated under reduced pressure, cooled, and diluted with 300 ml. of ice water. After 2.5 hours at room temperature, the solid 5-benzoyl-1-ethyl-3-methyl-4 - (p-toluenesulfonamido)pyrazole that precipitates is isolated, washed with water, and dried.

To a stirred mixture of 2.0 g. of 50% sodium hydride in mineral oil dispersion and 30 ml. of N,N-dimethylformamide at room temperature is added in portions 13.5 g. of 5-benzoyl - 1 - ethyl-3-methyl-4-(p-toluenesulfonamido)pyrazole. The resulting mixture is stirred for 30 minutes, 8.8 g. of dimethyl sulfate is added dropwise, and stirring is continued at room temperature for 2 hours. The mixture is then concentrated under reduced pressure and diluted with ethyl acetate. The ethyl acetate solution is washed with water, with 1 N sodium hydroxide, and with saturated aqueous sodium chloride, dried and evaporated, and the residue triturated with petroleum ether to give 5 - benzoyl - 1 - ethyl - 3 - methyl-4-(N-methyl-p-toluenesulfonamido)pyrazole.

A mixture consisting of 2.3 g. of sodium, 13 g. of naphthalene, and 150 ml. of 1,2-dimethyoxyethane is stirred under nitrogen at room temperature for 90 minutes, and to the resulting solution is added a solution of 12 g. of 5-benzoyl-1-ethyl-3-methyl - 4 - (N - methyl-p-toluenesulfonamido)pyrazole in about 100 ml. of 1,2-dimethoxyethane. The mixture is stirred at room temperature for 2 hours and is then cautiously treated with about 35 ml. of water and diluted with an equal volume of ethyl acetate. The aqueous phase is discarded and the organic phase is washed with saturated aqueous sodium chloride and extracted with 200 ml. of 1 N hydrochloric acid. The acidic aqueous extract is made strongly alkaline with 30% aqueous sodium hydroxide, and the alkaline mixture is extracted with ether. The ether extract is washed with water, dried, and evaporated to give 5-benzoyl - 1 - ethyl - 3 - methyl-4-(N-methylamino)pyrazole, isolated as an oil that is used in the following reaction without further purification.

A mixture consisting of 4.0 g. of 5-benzoyl-1-ethyl-3-methyl-4-(N-methylamino)pyrazole, 8.0 g. of glycine ethyl ester hydrochloride, 1.0 ml. of piperidine, and 35 ml. of pyridine is stirred and heated under reflux for 30 hours and then evaporated to dryness under reduced pressure. The residue is shaken with a mixture of 100 ml. of methylene chloride and 50 ml. of water, and the methylene chloride phase is separated, dried, and evaporated to give 1-ethyl-4,6-dihydro-3,4-dimethyl-8-phenyl-pyrazolo[4,3-e][1,4]diazepin-5(1H) - one; 99–102° C., following several crystallizations from cyclohexane with charcoal treatment.

To a solution of 18.5 g. of the above phenylpyrazolodiazepinone intermediate product in 250 ml. of dichloromethane is added with stirring 14.5 g. of m-chloroperbenzoic acid. After the initial exothermic reaction subsides, the reaction mixture is kept at room temperature for 16 hours and is then shaken with 5% aqueous sodium bicarbonate. The organic phase is separated, dried, and evaporated to give the desired 1-ethyl-4,6-dihydro-3,4-dimethyl - 8 - phenylpyrazolo[4,3-e][1,4] - diazepin-5 (1H)-one, 7-oxide starting material; M.P. 145.5–147.5° C., following crystallization from ethyl acetate.

(B) 4,6-dihydro-1,3-dimethyl-8-phenylpyrazolo[4,3-e] [1,4]-diazepin-5(1H)-one, 7-oxide 4-amino-5-benzoyl-1,3-dimethylpyrazole is prepared in a manner analogous to the preparation of 4-amino - 5-benzoyl - 1 - ethyl - 3 - methylpyrazole that is described in Example 1 above, by substituting 1,3-dimethylpyrazole-5-carboxylic acid for the 1-ethyl-3-methylpyrazole-5-carboxylic acid in the first step of that procedure and then carrying out the successive reactions with nitric acid, thionyl chloride, benzene and aluminum chloride, and hydrogen in the presence of Raney nickel.

A mixture consisting of 9.0 g. of 4-amino - 5 - benzoyl-1,3-dimethylpyrazole, 18 g. of glycine ethyl ester hydrochloride, 2.0 ml. of piperidine, and 100 ml. of pyridine is stirred and heated under reflux for 30 hours and then evaporated to dryness under reduced pressure. The residue is shaken with a mixture of 250 ml. of methylene chloride and 100 ml. of water, and the methylene chloride phase is separated, treated with charcoal and anhydrous magnesium sulfate, filtered, and evaporated under reduced pressure to give 4-6-dihydro-1,3-dimethyl-8-phenylpyrazolo[4,3-e][1,4]diazepin-5(1H)-one; M.P. 267–270° C., following crystallization from ethanol.

To a solution of 35 g. of 4,6-dihydro-1,3-dimethyl-8-phenylpyrazolo[4,3-e][1,4]diazepin-5(1H) - one in 950 ml. of dichloromethane is added with stirring 30.8 g. of 85% m-chloroperbenzoic acid. After the initial exothermic reaction subsides, the reaction mixture is kept at room temperature for 16 hours and is then shaken with 5% aqueous sodium bicarbonate. The organic phase is separated, dried, and evaporated to give the desired 4,6-dihydro - 1,3 - dimethyl - 8 - phenylpyrazolo[4,3-e][1,4] diazepin-5(1H)-one, 7-oxide; M.P. 242–242.5° C., following successive crystallizations from ethanol-pentane and acetonitrile.

(C) 4,6-dihydro-1,3,4-trimethyl-8-phenylpyrazolo [4,3-e][1,4]diazepin-5(1H)-one, 7-oxide To a stirred mixture of 3.3 g. of 56.6% sodium hydride in mineral oil dispersion and 30 ml. of dimethyl sulfoxide is added a solution of 20 g. of 4,6-dihydro-1,3-dimethyl-8-phenylpyrazolo[4,3-e][1,4]diazepin-5(1H)-one, 7 - oxide in 90 ml. of dimethyl sulfoxide while the temperature is maintained below 18° C. The resulting mixture is stirred at 15° C. for 10 minutes and is then treated with 11.5 g. of methyl iodide. The new reaction mixture is stirred at room temperature for 90 minutes, an additional 10 drops of methyl iodide are added, and the mixture is stirred for 30 minutes more. It is then washed with pentane and poured into about 75 ml. of ice water. The resulting aqueous mixture is extracted with ethyl acetate, and the ethyl acetate extract is washed with water, dried, and evaporated to give the desired 4,6-dihydro-1,3,4-trimethyl-8 - phenylpyrazolo[4,3-e][1,4]diazepin-5(1H)-one, 7-oxide; M.P. 150–152° C., following crystallization from isopropyl alcohol-pentane.

EXAMPLE 3

A mixture consisting of 3.26 g. of 1-ethyl-4,6-dihydro-6 - hydroxy-3-methyl-8-phenylpyrazolo[4,3-e][1,4]diazepin-5(1H)-one, acetate ester, 0.8 g. of 50% aqueous sodium hydroxide, 6.5 ml. of water, and 70 ml. of ethanol is kept at room temperature for 17 hours and is then treated with solid carbon dioxide to adjust the pH to about 8. The resulting mixture is evaporated under reduced pressure, the residue obtained is extracted with hot 2-butanone, and the hot extract is treated with charcoal, filtered, and cooled to give a solid precipitate of 1-ethyl-4,6-dihydro - 6 - hydroxy - 3 - methyl - 8 - phenylpyrazolo[4,3-e][1,4]diazepin-5(1H)-one, which is isolated and dried; M.P. 217–219° C., following crystallization from acetonitrile-ether.

EXAMPLE 4

Utilizing the procedure described in Example 3 above, the following phenylpyrazolodiazepinone compounds are obtained from the hydrolysis mixtures indicated below:

(a) From 5.5 g. of 1-ethyl-4,6-dihydro-6-hydroxy-3,4-dimethyl - 8 - phenylpyrazolo[4,3-e][1,4]diazepin-5(1H)-one, acetate ester, 1.5 g. of 50% aqueous sodium hydroxide, 10 ml. of water, and 300 ml. of ethanol, there is obtained 1 - ethyl - 4,6-dihydro-6-hydroxy-3,4-dimethyl-8-phenylpyrazolo[4,3-e][1,4]diazepin - 5(1H) - one; M.P. 188–189.5° C., following crystallization from acetonitrile.

(b) From 7.8 g. of 4,6-dihydro-6-hydroxy-1,3-dimethyl-8 - phenylpyrazolo[4,3-e][1,4]diazepin-5(1H)-one, acetate ester, 2.1 g. of 50% aqueous sodium hydroxide, 10 ml. of water, and 300 ml. of ethanol, there is obtained 4,6 - dihydro - 6 - hydroxy-1,3-dimethyl-8-phenylpyrazolo[4,3-e][1,4]diazepin-5(1H) - one; M.P. 246.5–248° C., following crystallization from N,N-dimethylformamide.

(c) From 7.7 g. of 4,6-dihydro-1,3,4-trimethyl-8-phenylpyrazolo[4,3-e][1,4]diazepin-5(1H)-one, acetate ester, 2.0 g. of 50% aqueous sodium hydroxide, 10 ml. of water, and 300 ml. of ethanol, there is obtained 4,6-dihydro-6 - hydroxy - 1,3,4 - trimethyl-8-phenylpyrazolo[4,3-e][1,4]diazepin-5(1H)-one; M.P. 211–213° C., following crystallization from acetonitrile-ether.

What is claimed is:

1. A member of the class consisting of phenylpyrazolodiazepinone compounds having the formula:

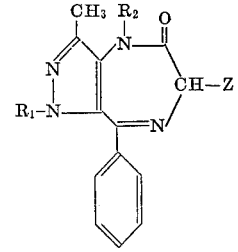

and pharmaceutically-acceptable salts thereof; where $R_1$ is a member of the class consisting of methyl and ethyl, $R_2$ is a member of the class consisting of hydrogen and methyl, and Z is a member of the class consisting of hydroxy and acetoxy.

2. A compound according to claim 1 which is 1-ethyl-4,6 - dihydro - 6 - hydroxy - 3 - methyl - 8 - phenylpyrazolo[4,3-e][1,4]diazepin-5(1H)-one, acetate ester.

3. A compound according to claim 1 which is 1-ethyl-4,6 - dihydro - 6 - hydroxy - 3 - methyl - 8 - phenylpyrazolo[4,3-e][1,4]diazepin-5(1H)-one.

4. A compound according to claim 1 which is 1-ethyl-4,6 - dihydro - 6 - hydroxy - 3,4 - dimethyl- 8 - phenylpyrazolo[4,3-e][1,4]diazepin-5(1H)-one.

References Cited

UNITED STATES PATENTS 3,296,249  1/1967  Bell _____ 260—239.3

HENRY R. JILES, Primary Examiner

R. T. BOND, Assistant Examiner

U.S. Cl. X.R.

424—2.73